3,441,708
WELDING
John A. Gilbert, Upland, Calif., assignor to Unitek Corporation, Monrovia, Calif., a corporation of California
Continuation-in-part of application Ser. No. 389,901, Aug. 17, 1964. This application July 16, 1965, Ser. No. 478,012
Int. Cl. B23k 11/24
U.S. Cl. 219—110      1 Claim

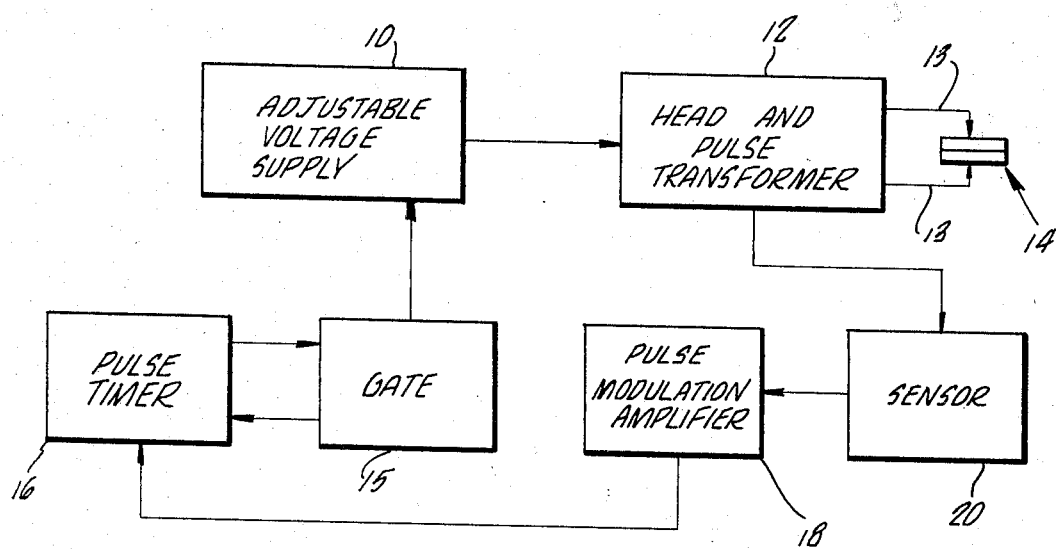
FIG_1

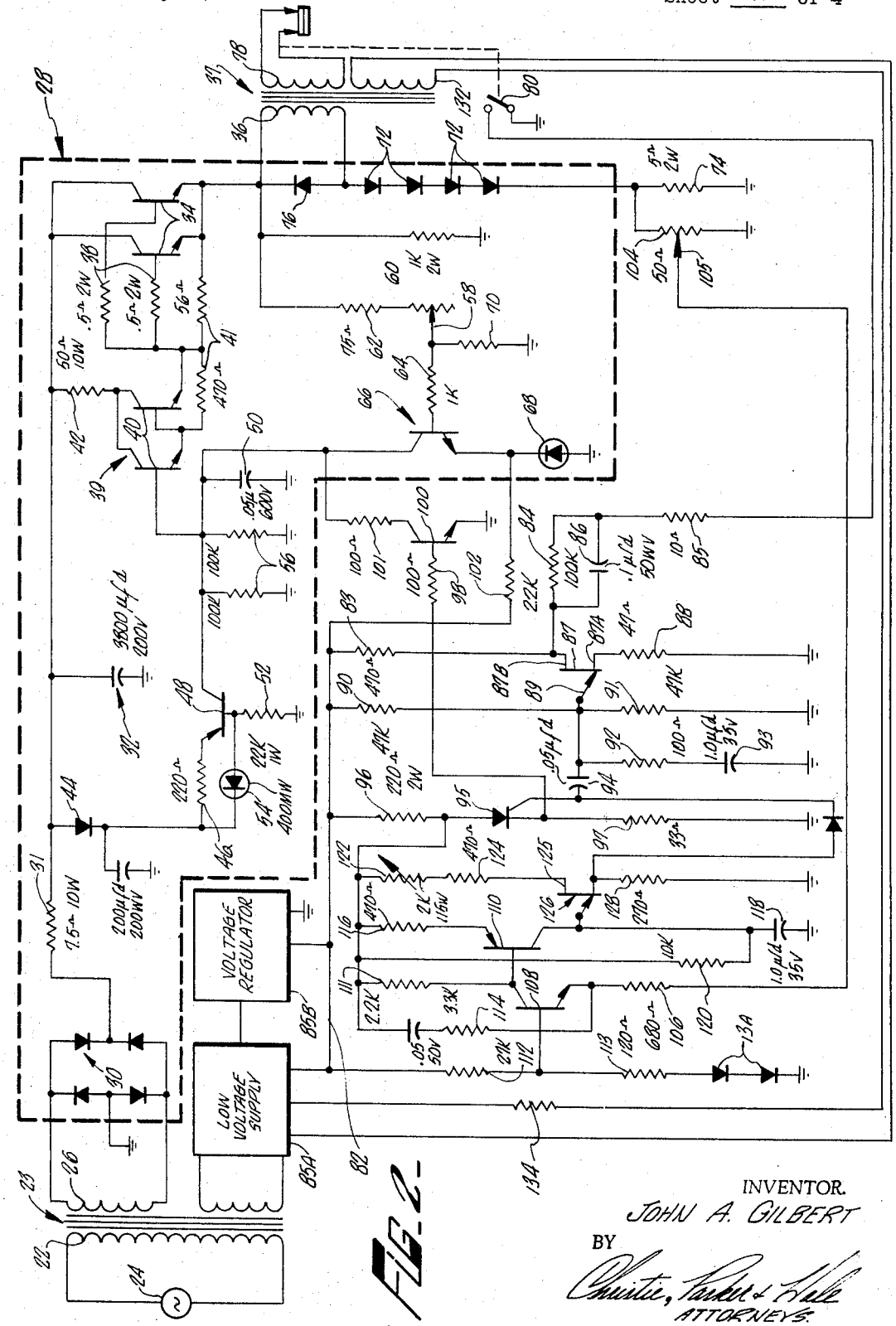

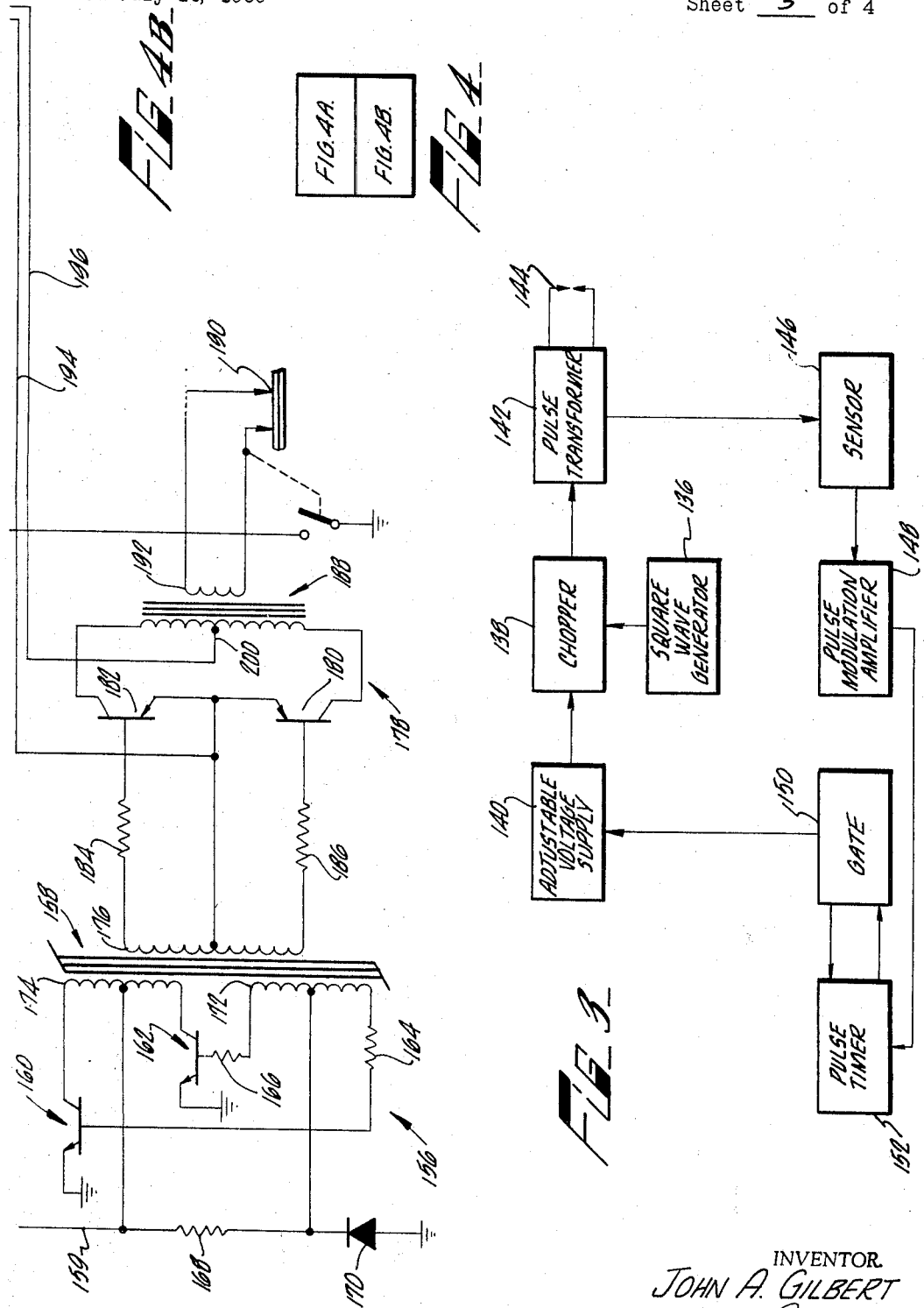

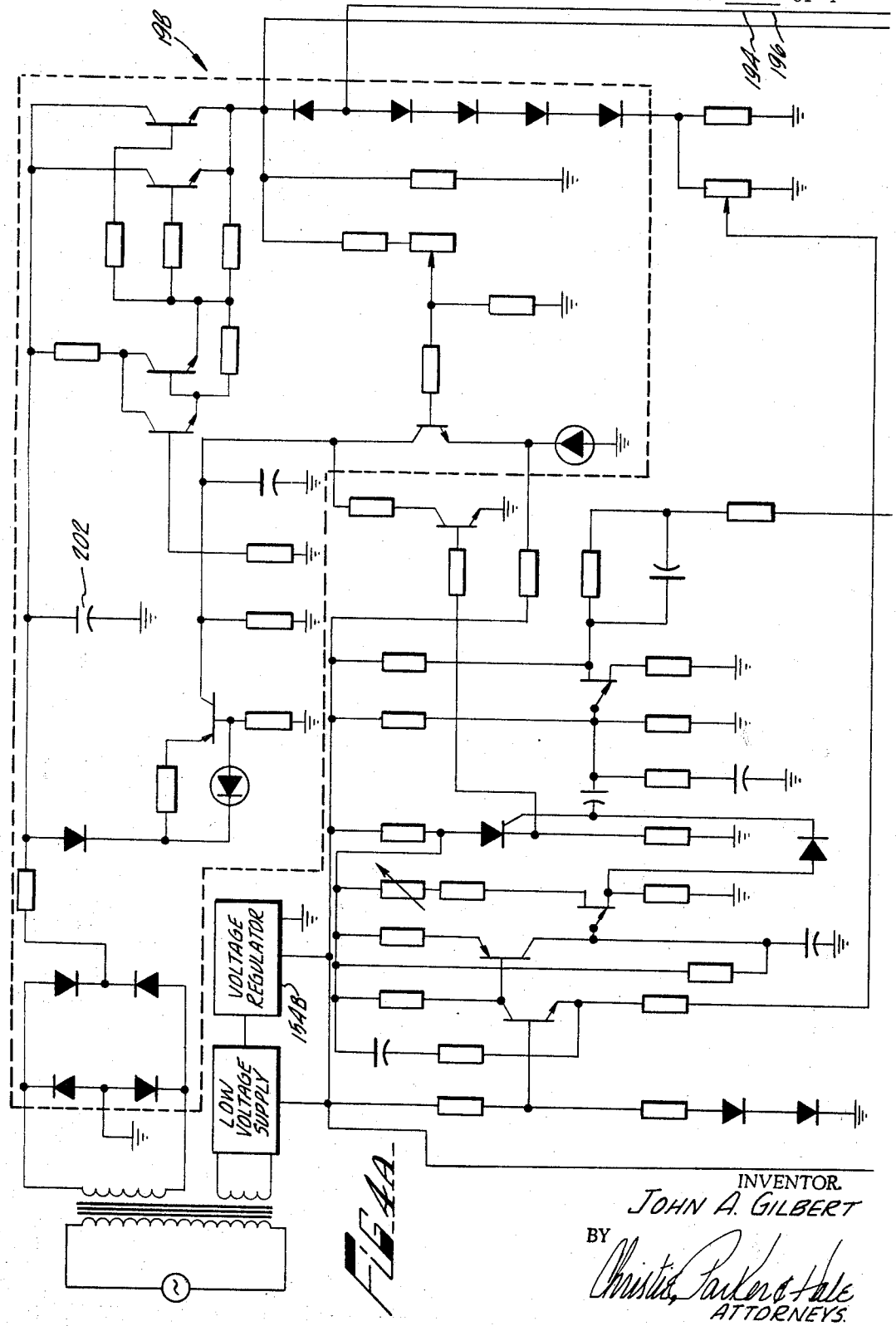

ABSTRACT OF THE DISCLOSURE

A resistance welding apparatus operating on the stored energy principle. The apparatus includes a regulated voltage supply connected to a welding energy storage capacitor which is in turn connected to a transformer and a pair of welding electrodes. Supporting circuitry is connected to the transformer-welding electrode circuitry for measuring electrical parameters at the weld. The supporting circuitry also adjusts the duration of the welding energy pulse supplied from the power supply-capacitor circuitry in response to deviations of electrical parameters at the weld from a reference value. Additional circuitry may be inserted between the capacitor and transformer for periodically interrupting the flow of energy therebetween permitting additional flexibility in the selection of the type of transformer used.

---

This is a continuation-in-part of application Ser. No. 389,901 filed Aug. 17, 1964, and now abandoned.

This invention relates to welding and more particularly to a power supply for use with stored energy resistance welding apparatus.

In stored energy resistance welding, two pieces of metal are contacted by a pair of electrodes and forged together by passing a pulse of electric energy from one electrode to the other through the metal pieces to be welded. The electrodes may be located on the same or opposite sides of the metal pieces. The circuit of this invention is intended for use primarily with equipment locating the electrodes on the same side of the work pieces, a configuration usually referred to as parallel gap welding.

Depending on the nature and weight of metal being welded, the amount of current used and the force applied by the electrodes must be carefully selected to obtain a satisfactory weld. In many types of production runs, the size of the pieces being welded together vary from one weld to the next, often causing unsatisfactory welds. If a conventional welder is set to make satisfactory welds on pieces of one size, and larger pieces are placed beneath the electrodes, there is usually less resistance between the electrodes and the greater mass of material prevents the temperature from rising as high as is ordinarily required for a good weld. Consequently, the weld is below standard because it is not sufficiently heated. On the other hand, if the pieces are smaller than usual, they offer greater resistance and less mass, so that heating is excessive, thus causing an unsatisfactory weld.

This invention provides an improved welding circuit which automatically corrects welding energy for variations in the size of materials being welded. This eliminates the necessity of an operator determining the size of the parts to be welded and manually changing the energy setting of the welder to obtain consistent welds for variations in material sizes.

In the welding circuit of this invention, the amount of welding energy or power is modulated or adjusted as a function of the size of material being welded and the rate of temperature rise.

In terms of apparatus, this invention includes a source of electrical energy connected to a pair of welding electrodes. A timing circuit is connected to the source of electrical energy for controlling the length of time the source supplies power to the welding electrodes. Means responsive to the resistance change of the weld is connected to the timing circuit for adjusting the amount of power delivered to the electrodes from the source.

The timing circuit causes the power supply to deliver a standard amount of welding energy to the welding electrodes as long as the welded parts are of a standard size. However, if parts which are larger than standard are placed between the welding electrodes so that there is less resistance between the electrodes, the change in resistance is sensed and a control signal is generated. The change in resistance can be detected in several ways, e.g., due to an increase of welding current in a constant voltage system, a decrease of voltage imposed across the electrodes and the parts being welded in a constant current system and by a direct measurement of the resistance change. This change in current, voltage or resistance generates a signal which is applied to the timing circuit to cause the delivery of more welding energy to the electrodes to compensate for the increased size of the parts and thus produce a uniform weld. Conversely, if the parts being welded are smaller than standard, the timing circuit is controlled accordingly so that the less welding energy is delivered to the parts to produce a satisfactory weld.

In the presently preferred embodiment of the invention, an adjustable regulated power supply is connected to a chopper which is in turn connected to a pulse transformer and welding head to supply welding power to the pair of welding electrodes. A switch responsive to the pressure applied by the electrodes to the work being welded generates a signal which starts a pulse timer and activates a gate which in turn initiates the flow of energy from the regulated power supply to the chopper. The gate is kept activated by the pulse timer for an amount of time controlled by a signal from a modulation amplifier which, in turn, is responsive to a signal which is proportional to weld current. The modulation amplifier has a variable gain to permit adjustment of the circuit to accommodate parts of different sizes and electrical resistivity.

These and other aspects of the invention will be more fully understood from the following detailed description and the accompanying drawings in which:

FIG. 1 is a block diagram of an embodiment of the invention;

FIG. 2 is a schematic circuit diagram of the embodiment of FIG. 1;

FIG. 3 is a block diagram of the presently preferred embodiment of the invention;

FIG. 4 is a diagram showing how FIGS. 4A and 4B should be fitted together for convenient reference; and FIGS. 4A and 4B are schematic circuit diagrams of the embodiment of FIG. 3.

Referring to FIG. 1, a regulated adjustable voltage supply 10 is connected to a welding head and pulse transformer 12 which supplies welding energy to a pair of electrodes 13 beneath which are two pieces of work 14 to be welded together. The welding head and pulse transformer can be of any conventional type, such as that shown in U.S. Patent 2,872,564.

The amount of energy furnished by the regulated voltage supply to the welding head and pulse transformer is controlled by a gate 15 which, in turn, is operated for a period of time controlled by a pulse timer 16. A signal from the welding electrodes, when proper welding pressure is applied to the work, initiates the gate and pulse timer, and a signal from a pulse-modulation amplifier 18 turns off the pulse timer, which inactivates the gate. The modulation amplifier is responsive to a deviation of current, voltage or resistance from a predetermined value as detected by sensor 20. The signal developed by the pressure applied by the welding electrodes to the work can be generated by any suitable means, such as the pressure-sensitive switch shown in U.S. Patent 2,872,564.

In operating the welding circuit shown in FIG. 1, the regulated adjustable voltage supply is set to apply a pulse of desired amplitude to the welding electrodes when the supply is actuated by the gate. The work is placed beneath the electrodes which are forced against it until the pressure-sensitive switch (not shown in FIG. 1) is actuated to provide a signal which initiates the gate and pulse timer which controls the duration of the welding pulse in accordance with the sensing signal passing through the pulse-modulation amplifier. The current flowing through the electrodes, the difference of potential across the electrodes or the resistance between them is detected by the sensor, which provides the signal amplified by the modulation amplifier which is applied to the pulse timer for obtaining proper well time. The larger the signal from the modulation amplifier, the longer the pulse timer is on and the greater the amount of welding energy applied to the welding electrodes. For relatively large pieces of work which have lower resistance and slower heating rate, a relatively large amount of power is supplied to the electrodes. Conversely, if the parts are smaller, they offer greater resistance, heat up faster, and thus cause a smaller signal to be supplied to the modulation amplifier so the pulse timer turns off sooner, resulting in a smaller amount of welding energy being supplied.

Referring to FIG. 2, a center-tapped primary winding 22 of a first transformer 23 is supplied power from a conventional A.C. source 24. A secondary winding 26 in a regulated adjustable voltage power supply stage 28 is connected through a full-wave rectifier bridge 30 and a power supply current-limiting resistor 31 to one side of a welding energy storage capacitor 32, the other side of which is grounded. The storage capacitor 32 is adapted to be discharged through a pair of parallel-connected power regulator transistors 34 and a primary winding 36 of a welding transformer 37. The bases of the series power regulator transistors are connected by respective balancing resistors 38 to the output of a driver stage 39 which includes a pair of driver transistors 40. Leak suppression resistors 41 are connected in series as shown in the driver stage across the bases and emitters of the driver transistors. A resistor 42 connects the collectors of the transistors in the driver stage to the positive side of the welding energy storage capacitor.

The positive side of the welding energy storage capacitor is also connected through a driver circuit isolation diode 44 and an emitter resistor 46 to the emitter of a current-limiting transistor 48, the collector of which is connected through a pulse-shaping capacitor 50 to ground. The capacitor 50 forms a slight slope on the leading edge of the pulse delivered from the storage capacitor 32 to provide more uniform and satisfactory heating of the parts during the welding operation. The base of the current-limiting transistor 48 is connected through a biasing resistor 52 to ground and to one side of a Zener diode 54, the other side of which is connected to the driver circuit isolation diode 44. A pair of bleeder resistors 56 are connected in parallel with the slope-forming capacitor 50.

A rheostat 60 is connected at one end through a resistor 62 to the emitters of power regulator resistors. A movable tap 58 which slides along rheostat 60 provides a signal which is applied through a resistor 64 to the base of a regular control transistor 66, the collector of which is connected to the collector of the current-limiting transistor 48. The emitter of the regulator control transistor is connected to ground through a Zener diode 68 which provides a reference voltage for the regulated power supply. Tap 58 is also grounded through a resistor 70.

Current from the primary winding 36 of the weld transformer 37 flows to ground through four series-connected diodes 72 and a welding current sensor resistor 74. A transient suppresser diode 76 is connected across the primary winding 36 of the welding transformer. Diodes 72 provide reverse bias for the power regulating transistors 34 to reduce leakage current during the off portion of each cycle.

A secondary winding 78 of the welding transformer is connected to a pair of welding electrodes which fit on the same side of two pieces of work 79 to be welded together. A normally open weld switch 80 is closed when the pressure exerted by the electrodes reaches a value suitable for welding. Closing of the weld switch 80 connects a low voltage supply line 82 to ground through a first resistor 83, a second resistor 84, and a third resistor 85. The voltage on line 82 is kept substantially constant by a conventional low voltage supply 85A and voltage regulator 85B. A capacitor 86 is connected across resistor 84. Closing the weld switch develops a negative pulse to trigger a pulse generator unijunction transistor 87, which has a base 87A grounded through a resistor 88. A base 87B of the trigger pulse generator is connected between resistors 83 and 84. The emitter 89 of the trigger pulse generator transistor is connected between resistors 90 and 91 which are connected in series between the low voltage supply line 82 and ground. The emitter of the trigger pulse generator is also connected through a voltage-dropping resistor 92 and a capacitor 93 to ground. A trigger pulse coupling capacitor 94 couples a negative pulse from the trigger generator to a gate control switch 95, which is normally conducting from the low voltage supply line through an anode loading resistor 96 and a cathode loading resistor 97 to ground. The negative pulse from the trigger pulse generator causes the gate control switch to stop conducting removing the base drive applied through a gate current-limiting resistor 98 from the normally conducting gating transistor 100, the collector of which is connected through a resistor 101 to the base of the first driver stage transistor 40. The emitter of the gating transistor 100 is connected to ground. Removal of the base drive from the gating transistor as the gate control switch stops conducting causes the driver stage transistors to place the power regulator transistors in a conducting state to start the welding pulse through the welding transformer primary winding. The voltage of this pulse is determined by the setting of the adjustable tap 58 on rheostat 60. A biasing resistor 102 is connected between the low voltage supply line 82 and the power supply reference diode 68.

The amount of current which flows through the primary winding of the welding transformer depends on the material disposed between the welding electrodes, and the magnitude of this current is sensed at resistor 74 to develop a signal which is passed to ground through a modulation control rheostat resistor 104. A movable tap 105 on the modulation control resistor supplies an adjustable signal through a feedback resistor 106 to the emitter of a normally conducting modulation amplifier transistor 108, the collector of which is connected to the base of a charging transistor 110 and a load resistor 111 The base of the modulation amplifier transistor is connected between biasing resistors 112 and 113, which are connected in series between the low voltage supply line and ground. A pair of series-connected diodes 113A are connected between resistor 113 and ground for the purpose of temperature compensation. The emitter of the modulation amplifier transistor is also connected through a resistor 114 and a capacitor 115 to the gate control switch. The capacitor 115 momentarily blocks the modulation amplifier transistor when the gate control switch is turned off by the signal from the welding switch. The emitter of the charging transistor 110 is connected through a load resistor 116 to the gate control switch, and the collector of the charging transistor is connected through a timing capacitor 118 to ground. A pulse timelimiting resistor 120 is connected between the collector of the charging transistor and the gate control switch. Variable trimming time adjusting resistor 122 is connected in series with a current-limiting resistor 124 and a first base 125 of a timing pulse generator unijunction transistor 126. A current-limiting resistor 128 connects a second base of the timing pulse generator to ground. A diode 130 has its anode connected to the side of resistor 128 remote from ground, and its cathode connected to the gate control switch 95.

In the operation of the circuit shown in FIG. 2, when the welding switch closes, the trigger pulse generator delivers a negative pulse through coupling capacitor 94 to the gate control switch, which is made non-conducting. This delivers a negative pulse to turn off the normally conducting gating transistor, which activates the drivers 40 to turn on the power regulator transistors 34 and deliver a welding pulse through the primary winding of the welding transformer. The amount of current flowing through the primary winding is proportional to the conductivity, i.e., size, of the work being welded, and generates a signal accordingly at the current sensing resistor 74. This signal is attenuated by the modulation control rheostat in accordance with the setting of tap 105, and this signal is applied as negative feedback to the emitter of the modulation amplifier transistor 108 which, in turn, determines the time required for charging the timing capacitor 118 by varying the bias of the base of the normally conducting charging transistor 110. If there is no signal from the current-sensing resistor 74, the charging transistor 110 conducts, and the timing capacitor 118 reaches a full charge quickly through transistor 110. The larger the signal from the current-sensing resistor, the less the charging transistor conducts, thus requiring longer for the timing capacitor 118 to charge. When the capacitor 118 is sufficiently charged, it fully discharges through the timing pulse generator 126 to send a positive pulse through diode 130 to make the gate control switch 95 conducting again, dropping the voltage across resistor 96 sufficiently to prevent charging transistor from conducting so the timing capacitor 118 remains discharged. The discharge of capacitor 118 applies a positive pulse to the gate control switch 95, which then conducts and applies a positive pulse to the gating transistor 100, making it conduct again and terminating the welding pulse. Thus, the larger the signal from the current sensor resistor, the more energy supplied by the welding pulse.

The pulse voltage output is set by adjusting the tap 58 on rheostat 60 to produce an initial voltage of the welding pulse to provide satisfactory welds for pieces of material near the highest end of the range of sizes anticipated of pieces to be welded. Tap 105 is set to its maximum, and is then adjusted so that satisfactory welds are automatically obtained through variations of size of pieces to be welded within the expected range. Ordinarily, the proper settings for the taps 58 and 105 are obtained by making a few experimental welds.

A bias winding 132 around the core of welding transformer 37 is supplied a biasing current from the low voltage supply through a resistor 134 to return the core to a condition which prevents saturation of the core during the welding pulse, and provides good pulse control with a relatively small transformer.

A circuit using components with the values indicated on FIG. 2 automatically produces satisfactory welds over a relatively wide range of part sizes without requiring manual adjustments.

The block diagram of FIG. 3 illustrates the preferred embodiment of the power supply of this invention. The circuit differs from that of FIG. 1 only in that several additional modules are incorporated into the circuit. Specifically, a square wave generator 136 and a chopper 138 are added to the circuit of FIG. 1 in the manner depicted in FIG. 3 such that an adjustable regulated power supply 140 is now connected through the chopper 138 to a pulse transformer 142. The frequency of the chopper is controlled by the square wave generator.

In all other respects the circuit remains essentially the same. The adjustable supply containing the welding energy storage capacitor and a regulated voltage supply is connected such that the output of the regulated supply is transmitted to the chopper 138. The output of the chopper is in turn connected to the transformer 142. As will be explained in more detail in conjunction with FIGS. 4A and 4B, the altered configuration of FIG. 3 makes possible certain modifications in transformer 142. Pulse transformer 142 is connected to welding electrodes 144 and to a resistance change sensor 146. Again, sensor 146 can be either a voltage, current or resistance sensitive device. The output of sensor 146 is fed to a pulse modulation amplifier 148 which is in turn connected to a gate 150 and a pulse timer 152. The gate is also connected to the adjustable supply 140 and to the pulse timer. Completing the circuit is a connection from the timer to the gate.

Referring to FIGS. 4A and 4B, the schematics are similar to that shown in FIG. 2 with the exception that a voltage regulator 154B is connected to the input of chopper 138. The chopper is driven by a square wave generator 136 which consists of a square loop or saturating core transformer 158, a pair of transistors 160 and 162, a pair of biasing resistors 164 and 166, a voltage dropping resistor 168 and a clamping diode 170. Square loop transformer 158 is provided with a pair of primary windings 172 and 174 and a secondary winding 176.

As used in the welding circuit of this invention the generator is free-running. It operates as follows. Assuming transistor 160 is conducting the voltage through winding 174 builds up to the point where it causes the core of transformer 158 to saturate. Saturation causes the transformer to present a sharp change of impedance to both transistors causing transistor 162 to begin conduction and at the same time terminating the conduction in transistor 160. When the core next saturates, the state of the transistor again changes. The operation of the generator continues in this alternating manner as long as power is supplied to the input lead 159. The frequency of oscillation of the generator is determined by the magnetic characteristics of the transformer 158 and the number of turns on the primary winding. Preferably, the frequency of the generator is 1,000 cycles.

The secondary winding 176 of transformer 158 is connected to a chopper 178 via connections to the base electrodes of a pair of transistors 180 and 182. The chopper also includes a pair of biasing resistors 184 and 186. The chopper output is connected to a transformer 188 which is in turn connected to the welding electrodes 190. The input to the chopper is supplied via connections 194 and 196 from a regulated voltage supply 198 to the emitters of the transistors and to the center tap 200 of the transformer respectively. In operation, the frequency of the chopper is determined by the square wave generator. When welding energy storage capacitor 202 is discharged, the stored energy is chopped by means of the chopper and the core of transformer 188 is alternately driven toward its positive and negative saturation point as the energy is transmitted to it by the alternating conduction of transistors 180 and 182.

By virtue of the particular circuit configuration of FIG. 4, transformer 188 now no longer needs to be a pulse transformer, that is, a transformer of the single polarity, direct current type. It can now be a conventional transformer because the circuit of this invention makes much more efficient use of the transformer in that the magnetic material of the transformer is alternately driven toward both its positive and negative saturation limits. With pulse transformers, the material is driven in only one direction which causes the transformer to take on a permanent "set" which has to be overcome each time a pulse is transmitted to the welding electrodes. This means that the pulse transformer must be relatively large in order to have sufficient flux capacity to permit it to respond to unipolar excitation. Because the transformer is now subjected to bipolar excitation, the core does not acquire any permanent magnetization and hence the flux capacity of the magnetic material of the transformer need no longer be as great. This means that the size of the metal core can be reduced and the amount of copper in the windings can also be reduced. Compared to the size of the pulse transformer such as that shown in FIG. 2 the size of the transformer in FIG. 4 is approximately one-eighth as large. In addition to permitting the use of a smaller weld transformer, other advantages attendant on the circuit configuration of FIG. 4 include greater welding pulse durations due to the alternating characteristic of the input which prevents transformer saturation and lower impedance windings which improve output voltage regulation.

What is claimed is:

1. Apparatus for the resistance welding of work pieces comprising an adjustable regulated source of electrical energy, a welding energy storage capacitor connected to said source, a transformer connected to said storage capacitor, a pair of welding electrodes connected to said transformer, said electrodes being adapted to be brought into physical contact with the work pieces, means for causing a pulse of energy to be supplied by the source in response to contact between the electrodes and work pieces, timing circuit means connected to the source of electrical energy for controlling the time duration of the welding energy pulse supplied by said source to the pair of welding electrodes, sensing means connected to the transformer for sensing the electrical current flowing through the welding electrodes at the initiation of a weld sequence, pulse modulation amplifier means connected between the sensing means and the timing circuit means for adjusting the timing circuit means responsive to the output from the sensing means whereby the duration of the energy pulse supplied from the source is changed in proportion to the change in the amount of resistance of the work pieces relative to a predetermined reference value.

References Cited

UNITED STATES PATENTS

| 3,313,912 | 4/1967 | Pease | 219—108 |
| 2,472,041 | 5/1949 | Davies | 219—110 |
| 2,848,595 | 8/1958 | Van Sciver | 219—108 |
| 2,967,227 | 1/1961 | Mierendorf | 219—108 |

RICHARD M. WOOD, *Primary Examiner.*

P. W. MAY, *Asistant Examiner.*

U.S. Cl. X.R.

219—108